No. 794,734. PATENTED JULY 18, 1905.
T. OWENS.
GLASS TANK.
APPLICATION FILED NOV. 28, 1904.
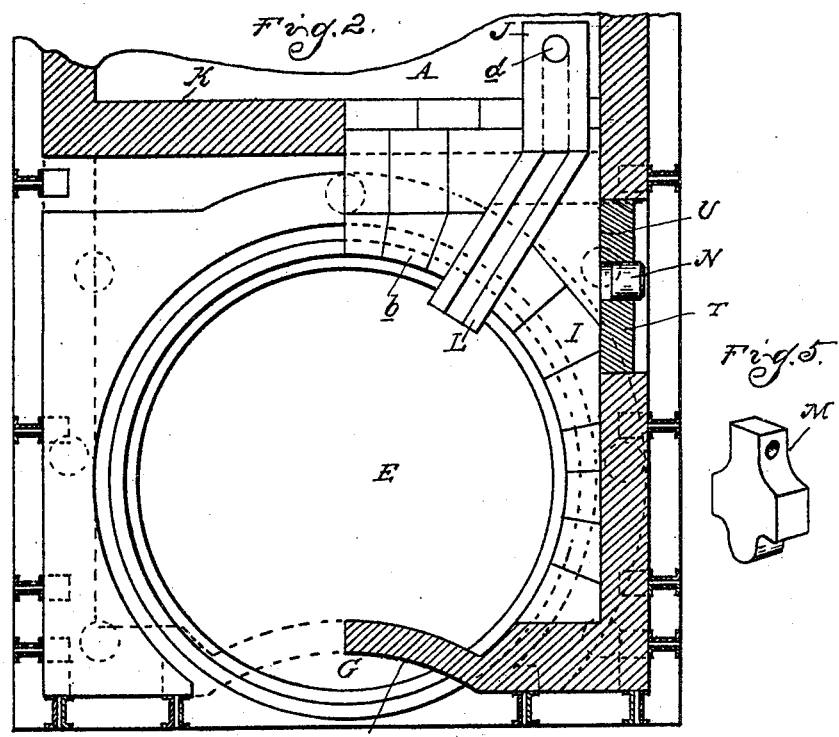
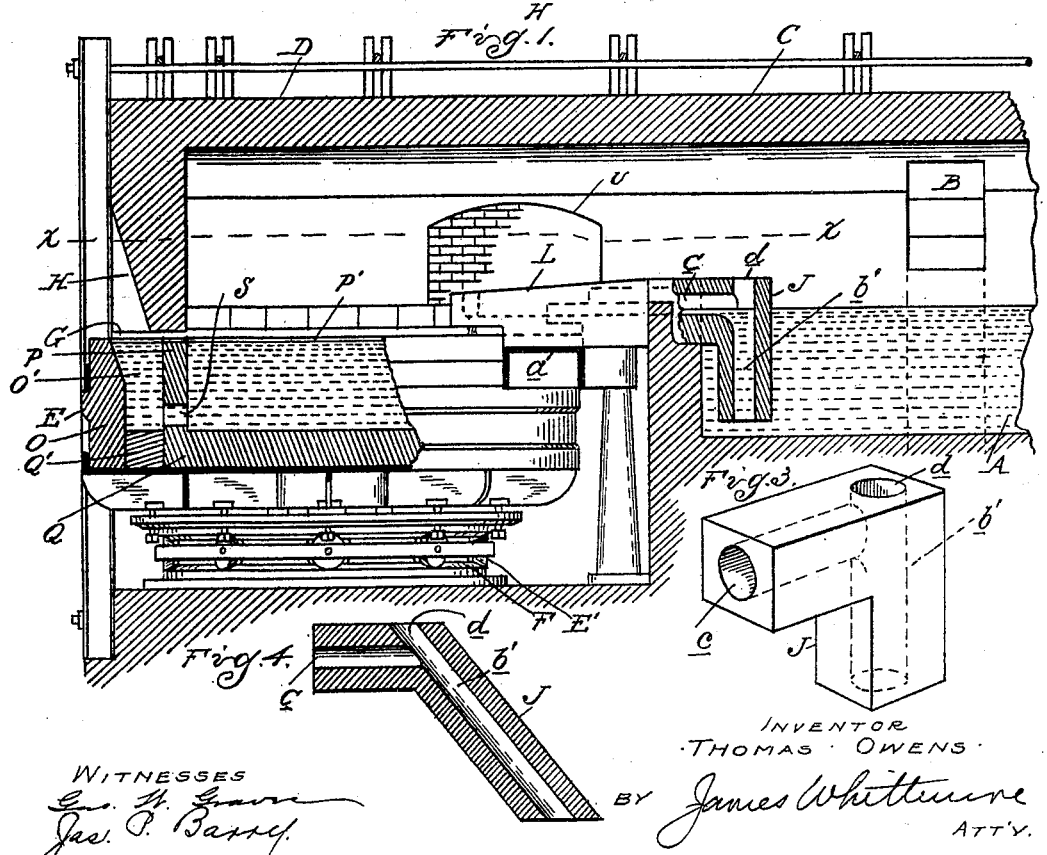
WITNESSES
INVENTOR
THOMAS OWENS
BY James Whittemore
ATT'Y.

No. 794,734. Patented July 18, 1905.

UNITED STATES PATENT OFFICE.

THOMAS OWENS, OF TOLEDO, OHIO, ASSIGNOR TO THE TOLEDO GLASS COMPANY, OF TOLEDO, OHIO, A CORPORATION OF OHIO.

GLASS-TANK.

SPECIFICATION forming part of Letters Patent No. 794,734, dated July 18, 1905.

Application filed November 28, 1904. Serial No. 234,578.

*To all whom it may concern:*

Be it known that I, THOMAS OWENS, a citizen of the United States, residing at Toledo, in the county of Lucas and State of Ohio, have invented certain new and useful Improvements in Glass-Tanks, of which the following is a specification, reference being had therein to the accompanying drawings.

The invention consists in the construction of a connecting spout or trunk between the melting-tank and a working tank, whereby I have been enabled to dispense with cross-walls in the melting-tank and whereby the device is more easily repaired and the parts liable to be burned out or destroyed are more easily replaced, and, further, in the construction of the rotary working tank having two chambers, the inner chamber being the one into which the glass is delivered and the outer annular chamber from which it is to be gathered, as more fully hereinafter described, and particularly pointed out in the claims.

In the drawings, Figure 1 is a vertical central section through a melting-tank and a working tank embodying my invention, the working tank being shown partly in elevation and the conduit or trunk being shown in section. Fig. 2 is a horizontal section on line $x$ $x$ of Fig. 1, the left-hand half of the bricks of the forehearth being omitted. Fig. 3 is a perspective view of the conduit or trunk which is to convey the glass from the bottom of the melting-tank to the spout, which discharges it into the working tank. Fig. 4 is a vertical central section therethrough, showing a slightly-modified form thereof. Fig. 5 is a perspective view of the valve to be inserted in the trough.

My invention relates particularly to the construction of the conduit or trunk illustrated in Figs. 3 and 4 and to the double-chambered rotary tank. The remaining structure is not a part of my invention, and therefore I will but briefly describe the same.

A is a melting-tank of the type known as the "continuous melting-tank," having the gas-ports B for the admission of the gas for combustion to melt the batch. C is the top thereof, which has the forward extension D over the rotary working tank E, supported on rollers E', running on a track F and operated by any suitable means (not shown) to rotate the same. The rotary tank E projects at the point G beyond the front wall H of the cover, so as to enable dipping or gathering at that exposed point. The rotary tank is slightly separated from the melting-tank and is slightly smaller than the top or roof, and the space between the side walls and the rotary tank is bridged by the forehearth I, consisting of a suitable metal frame $a$ and firebricks $b$ supported thereon, the forehearth preferably slightly overhanging the edges of the rotary tank and also covering the space between the melting and working tanks.

In order to get the glass from the melting-tank into the working tank, various constructions have been proposed and employed; but, so far as I am aware, they have all required cross-walls in the melting-tank or have been difficult for replacement or repair. My invention is intended to overcome these objections.

J is a tubular elbow or trunk having a vertical passage-way $b'$ and a horizontal passage-way $c$ therethrough, communicating at the angle. I preferably make the passage $b'$ extend clear through to the top, as shown at $d$, for the reason that it is more readily manufactured and in case it becomes clogged from glass it may be readily cleared. This elbow-shaped or angular conduit or trunk I support with its horizontal portion on the front wall K of the melting-tank and with its vertical portion depending to, or nearly to, the bottom, as plainly shown in Fig. 1.

L is a horizontal trough or spout extending from the end of the horizontal passage $c$ of the elbow J across the forehearth and above the working tank, as plainly shown in Fig. 2.

Instead of making the vertical leg of the elbow exactly vertical I preferably incline it at an obtuse angle to the horizontal portion, as shown in Fig 4, so that the inlet end will be some distance away from the front wall K of the melting-tank, for I find when the glass is taken from close proximity to this wall it is apt to be somewhat chilled, so that it will not readily flow, and therefore it is desirable to have the inlet end removed somewhat from the side walls of the tank in order to get the glass at the proper plasticity.

M is a valve designed to be inserted through the hand-hole N in the side wall of the tank and dropped into the trough L for the purpose of shutting off the flow of glass therethrough.

In the constructions heretofore employed the rotary tank has been made with a single chamber. I propose to make the tank with two chambers—to wit., an inner and an outer chamber—and to do this I preferably construct the tank, as shown in Fig. 1, consisting of the outer circular upright wall O and an inner circular upright wall P, spaced therefrom to form the two chambers O' and P', the chamber O' between the two walls and the chamber P' within the inner wall. The way I prefer to construct the tank is to make the wall P integral with the bottom portion Q, in effect making an inner pot, and then place an annular bottom portion Q' outside of this pot and within the wall O. The two chambers O' and P', I connect by suitable ports or passages S through the wall P.

The spout L is of sufficient length to extend from the chamber O' and to discharge into the chamber P', so that the glass will first enter the chamber P' and flow through the ports or passages S into the chamber O', from which it will be gathered. With this construction I find I get a better bending effect for the glass and get clearer and better glass after working at the gathering-point.

It is obvious without extended description that the glass will flow from the melting-tank through the vertical passage $b'$ in the elbow and then out through the horizontal passage $c$ therein and will be delivered into the inner chamber P', and then it will flow into the outer chamber, from which it is gathered. In case the flow is desired to be stopped the valve M is inserted in the trough. In case repair is necessary I take out the brickwork T from beneath the arch U in the side wall of the tank, and then the trough L and the elbow J can readily be removed and new ones inserted, or I can, if desired, dislodge any glass that may be somewhat hardened in the passage through the elbow.

Instead of making the passage $c$ in the shape of a passage I may make it in the shape of a groove, and that will be obvious without further illustration or description.

What I claim as my invention is—

1. The combination of a melting-tank, of a rotary working tank adjacent thereto, of a detachable tube extending to or nearly to the bottom of the melting-tank, and a horizontal conduit communicating with the top of said tube and discharging into said rotary working tank.

2. The combination of a melting-tank and an adjacent rotary working tank, of an open-top tubular conduit extending from near the bottom of the melting-tank to a point above the level of the glass therein and a horizontal conduit extending from the top of said tube and discharging into the working tank.

3. The combination of a melting-tank and an adjacent rotary working tank, of a conduit consisting of a tubular elbow J, having one arm projecting from near the bottom of the melting-tank to a point above the level of the glass therein and another arm extending horizontally therefrom, and a horizontal conduit from the outlet of said elbow discharging into the working tank.

4. The combination with a melting-tank and an adjacent rotary working tank, of a conduit between the two comprising a substantially vertical tubular detachable conduit extending from near the bottom of the working tank to a point above the level of the glass therein, and having an open top and a horizontal conduit communicating therewith and discharging into the working tank.

5. The combination with a working tank, of an inner ring dividing the tank into an inner and an outer chamber having communicating passages below the top, a melting-tank and means for delivering the glass from the melting-tank within the inner ring.

6. The combination with a melting-tank, a rotary working tank, an inner ring therein having ports at or near the ports or passages below the top and a spout for delivering the glass from the melting-tank to the chamber within the ring of the working tank.

7. The combination with a melting-tank, of a working tank consisting of an inner pot, an outer ring such as O and an interposed annular bottom portion such as Q' between the pot and the outer ring and ports such as S in the wall of the pot below the top surface thereof.

In testimony whereof I affix my signature in presence of two witnesses.

THOMAS OWENS.

Witnesses:
E. H. CLOSE,
O. L. INGLESBY.